(No Model.)

LA ROY S. UPTON.
POWDER HOLDER.

No. 538,561. Patented Apr. 30, 1895.

WITNESSES:
John A. Rennie
Theo. G. Hoster

INVENTOR
La Roy S. Upton
BY Munn & Co
ATTORNEYS.

UNITED STATES PATENT OFFICE.

LA ROY SUNDERLAND UPTON, OF PLATTSBURG, NEW YORK.

POWDER-HOLDER.

SPECIFICATION forming part of Letters Patent No. 538,561, dated April 30, 1895.

Application filed December 14, 1894. Serial No. 531,792. (No model.)

*To all whom it may concern:*

Be it known that I, LA ROY SUNDERLAND UPTON, of Plattsburg, in the county of Clinton and State of New York, have invented a new and Improved Powder-Holder, of which the following is a full, clear, and exact description.

The object of the invention is to provide a new and improved holder for containing tooth powder or like substances, and arranged to permit of quickly and conveniently delivering a certain amount of the contents onto a tooth brush or other device, and without danger of wasting the material.

The invention consists of a receptacle adapted to contain the powder, and a spring-pressed plunger carrying a cap and adapted to close or open the hopper end of the said receptacle.

The invention also consists of certain parts and details and combinations of the same, as will be fully described hereinafter and then pointed out in the claim.

Reference is to be had to the accompanying drawings, forming a part of this specification, in which similar letters of reference indicate corresponding parts in both the views.

Figure 1:
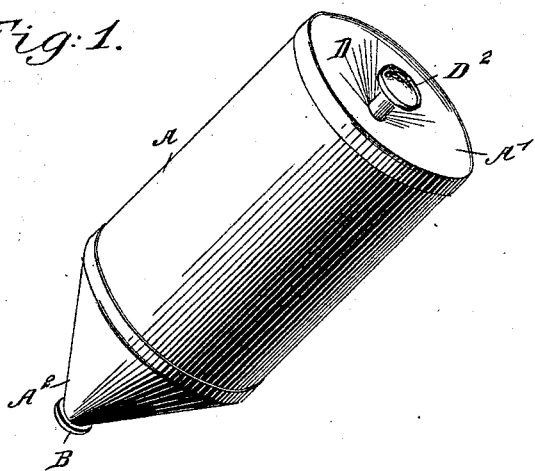
Figure 2:
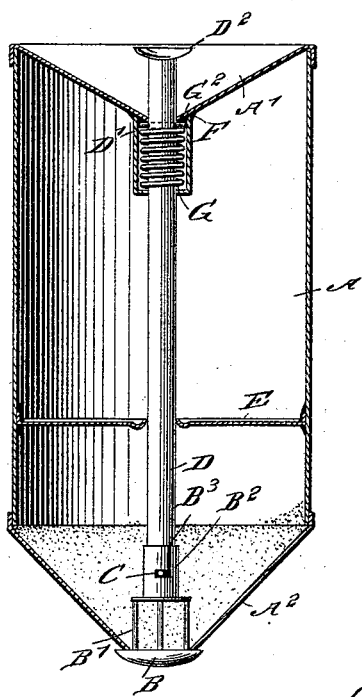

Figure 1 is a perspective view of the improvement, and Fig. 2 is a sectional side elevation of the same in position ready for delivering the contents.

The improved holder is provided with a suitably constructed receptacle A formed with a conical bottom A', and a hopper-shaped top $A^2$ having in its apex an opening for the passage of the contents of the receptacle when the latter is placed in an upside down position. The apex opening of the hopper $A^2$ is adapted to be closed by a valve B, formed with inwardly extending stems B' connected at their inner ends to a head carrying a sleeve $B^2$ formed with an L-shaped slot $B^3$, and adapted to fit on one end of a plunger D carrying a pin C for engagement with the L-shaped slot $B^3$ to lock the sleeve to the plunger and to permit of removing it therefrom to detach the valve to conveniently fill the receptacle A with the tooth powder or other desired substance.

The head above mentioned is of a size adapted, when the stem D is pushed in to its fullest extent, to close the opening at the apex of the conical top $A^2$ of the holder, so as to prevent further discharge of the contents thereof, and it will be seen that between the said head and the valve is comprised a chamber adapted to contain a certain quantity of the material in the holder, say enough for brushing one's teeth, and this quantity will be discharged from the holder each time the stem is depressed to its fullest extent. If more be required, the stem will not be pressed in to its fullest extent, or it may be pressed several times.

The plunger D is mounted to slide near its upper end in a guide E, and near its lower end in a casing F, secured to the apex of the bottom A' within the receptacle A, as is plainly shown in Fig. 2. In this casing F is arranged a spring G coiled on the plunger D and pressing on a pin $G^2$ thereon, so as to hold the said plunger normally in an outermost position to seat the valve B on the apex of the hopper $A^2$.

The outer end of the plunger D is provided with a knob or handle $D^2$ arranged within the base of the bottom A', and adapted to be pressed on by the operator to push the plunger D inward to open the valve B to permit the contents of the receptacle to feed through the hopper $A^2$ at the time the receptacle is placed in a position with the hopper downward.

It will be seen that when the receptcale A is filled with tooth powder or other substance and is placed in an angular position as shown in Fig. 1 with the hopper $A^2$ downward, then the operator by slightly pressing the knob $D^2$, causes the valve B to open, so that the substance contained in the receptacle feeds through the hopper $A^2$ onto the tooth brush or other article held below the apex of the hopper. As soon as the desired amount of the material has passed out of the receptacle, the operator releases the knob $D^2$ so that the previously compressed spring G returns the plunger to its normal position, at the same time seating the valve B on the apex opening of the hopper to stop the further out-flow of the substance. The valve B is removably connected with the plunger D to permit of conveniently filling the receptacle with the desired substance. The bottom A' is made conical, so that the knob $D^2$ is concealed within the base of the cone to permit of placing the receptacle on a table, without danger of being easily upset.

Having thus fully described my invention, I claim as new and desire to secure by Letters Patent—

The combination of a receptacle having a discharge opening, a movable stem mounted in the receptacle, a head having a sleeve to receive the stem, a bayonet joint between the stem and sleeve, a valve, and a stem connecting said valve to said removable head, said valve being arranged outside the receptacle and adapted to close the outlet opening thereof and the head being arranged inside the receptacle and also adapted to close said outlet opening, substantially as set forth.

LA ROY SUNDERLAND UPTON.

Witnesses:
WILLIAM M. MORROW,
F. F. PALMER.